United States Patent [19]

Eggert, Jr.

[11] Patent Number: 4,674,413
[45] Date of Patent: Jun. 23, 1987

[54] TRUCK FOR A RAILWAY CAR
[75] Inventor: Walter S. Eggert, Jr., Huntington Valley, Pa.
[73] Assignee: The Budd Company, Troy, Mich.
[21] Appl. No.: 549,951
[22] Filed: Nov. 9, 1983
[51] Int. Cl.$^4$ .............................................. B61F 5/26
[52] U.S. Cl. ............................ 105/224.05; 105/182.1; 105/218.1
[58] Field of Search ........... 105/182 E, 182 R, 224 R, 105/218 R, 218 A, 222, 223, 224.1, 224 A, 199 CB, 199 R, 197 R, 197 A, 53, 185, 224.02, 182.1, 218.1

[56] References Cited

U.S. PATENT DOCUMENTS

| | | | |
|---|---|---|---|
| 2,021,167 | 11/1935 | Blunt | 105/222 |
| 2,123,053 | 7/1938 | Kjolseth | 105/224.1 X |
| 2,132,001 | 10/1938 | Dean | 105/182 E |
| 2,836,130 | 5/1958 | Rossell | 105/224 R |
| 2,861,522 | 11/1958 | Rossell | 105/197 A X |
| 3,276,395 | 10/1966 | Heintzel | 105/224.1 |
| 4,046,080 | 9/1977 | Dieling et al. | 105/182 R X |
| 4,510,871 | 4/1985 | Habeck et al. | 105/224 R X |

Primary Examiner—Randolph A. Reese
Assistant Examiner—Glenn S. Foster
Attorney, Agent, or Firm—Edward M. Farrell; Harman Foster; Thomas I. Davenport

[57] ABSTRACT

An outboard journal railway truck includes a journal bearing having an auxiliary structure with resilient elements attached thereto for carrying devices which are maintained in a fixed wheel to rail relationship. A primary suspension system having longitudinal, lateral and vertical springs is connected between the journal bearing housing and a side frame. The secondary suspension system includes a steering beam for maintaining vertical springs in vertical positions during movement of the beam with respect to the side frames of the truck and for transmitting the load from a car body directly to the side frames of the truck.

12 Claims, 4 Drawing Figures

TRUCK FOR A RAILWAY CAR

BACKGROUND OF THE INVENTION

In a railway car, the primary suspension system generally refers to the suspension between the journal bearing assembly and the truck frame. The journal bearing assembly carries wheel axle units and acceleration forces generated by the wheels are transmitted through the primary suspension system to the side frames. The secondary suspension system refers to the system between the truck body and the car body. The present invention is directed to a novel truck having improved primary and suspension systems.

Many past primary suspension systems have involved elastomeric rings surrounding the journal bearings. Such rings have included cut-away portions to provide softer spring rates and the cut-away portions were designed to provide desired vertical longitudinal and lateral spring rates. Some of the primary suspension systems used heretofore are described in a U.S. Pat. No. 4,044,689, to Eggert issued Aug. 30, 1977 and in a copending application, assigned to the same assignee as the present invention, of Eggert entitled "Suspension System for a Railway Car", now U.S. Pat. No. 4,438,703, filed Feb. 12, 1982. Also, a pending application of Herring, Ser. No. 522,758, filed Aug. 12, 1983 relates to a primary suspension system not involving elastomeric rings.

When primary suspensions are made extremely soft, the excursion of the truck frame is quite excessive. Therefore, there are other things that must be done. It is important that means be provided to maintain the correct alignment and relationship of the third rail collector devices, the waveguides and trip switches and other devices on the truck that are used for signalling and control and power pick-up. All of these devices must run in a fixed relationship to the distance between the wheels and the rail.

In designing primary suspension systems, it is often desirable to be able to independently adjust the spring rates in the longitudinal, lateral and vertical directions. Different design requirements and car weights require different ratios between the spring rates involved. Independent adjustments of all three spring rates are normally not achievable with existing primary systems.

When very soft primary systems are employed, consideration must be given to the secondary suspension system. Generally, springs are disposed between the truck and the car body. When there is excessive movement between the car body and truck, the springs tend to distort. It is desirable that the vertical springs be maintained in vertical positions during relative movement between the car body and truck.

In conventional systems, the load from a car body is transmitted through a center king pin to a bolster fixed to the side frame. This arrangement generally results in added weight to the truck.

OBJECTS OF THE INVENTION

It is an object of this invention to provide an improved primary suspension system.

It is a further object of this invention to provide a truck having improved primary and secondary suspension systems.

It is still a further object of this invention to provide an improved outboard journal bearing truck with means for maintaining the relative distance between the wheels and rail constant for devices mounted to the truck.

It is still a further object of this invention to provide an improved primary suspension system in which the vertical, lateral and longitudinal suspension elements may be independently adjusted.

It is still a further object of this invention to provide an improved secondary suspension system for a railway car with improved transmission paths which result in lighter weight trucks.

SUMMARY OF THE INVENTION

An outboard journal bearing truck includes an auxiliary structure including resilient mounting means attached to the journal bearing in fixed space relationship with respect to the truck wheels and rail for receiving devices, such as third rail collectors. A primary suspension system includes longitudinal, vertical and lateral springs attached to a journal bearing housing connected to the axle of a wheel axle unit. A secondary suspension system including a steerable beam includes means for directing the load paths from a car body to a pair of side frames on the truck.

Other objects and advantages of the present invention will be apparent and suggest themselves to those skilled in the art from a reading of the following specification and claims, taken in conjunction with the accompanying drawings.

DESCRIPTION OF THE INVENTION

Figure 1:
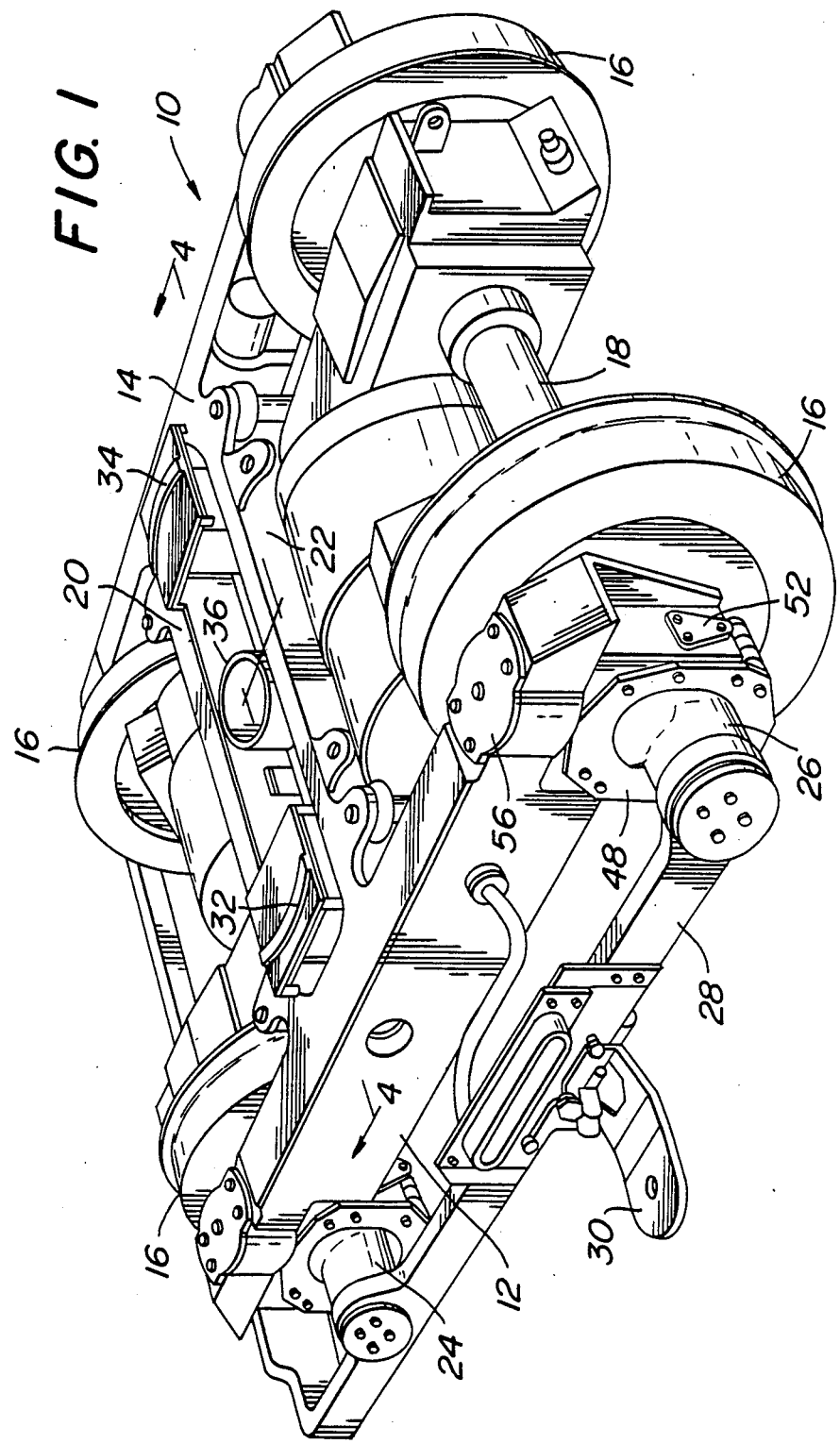
FIG. 1 is an isometric view of a railway truck in accordance with the present invention.

Referring to FIG. 1, a truck 10 comprises a pair of side beams 12 and 14 having wheel axle units connected thereto. The wheel axle units include wheels 16 and axles, only one of which axle 18 is illustrated in FIG. 1. The truck 10 is a rigid frame truck having the side frames 12 and 14 connected by integral cross sections 20 and 22.

Figure 2:
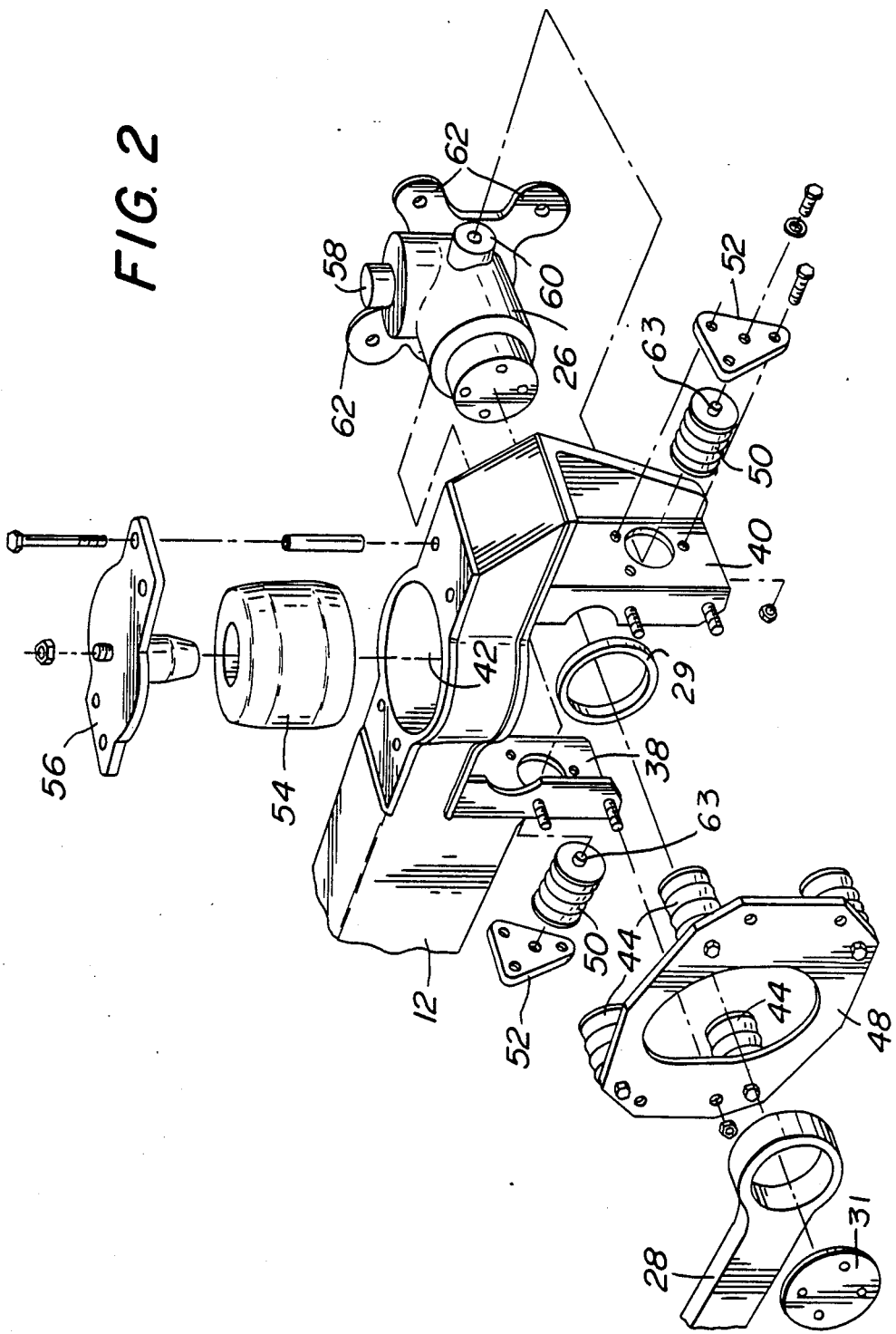
FIG. 2 is an exploded isometric view of a primary suspension system included in the truck illustrated in FIG. 1.

Journal boxes extending through the side frames 12 and 14 are disposed around the axles 18. Only the journal boxes 24 and 26 are illustrated in FIG. 1. An auxiliary frame 28 including a resilient ring element 29, is connected between a cover 31 and the journal box assemblies 24 and 26. This feature is illustrated in Fig. 2. The frame 28 is used to receive a third rail collector 30 and various other devices, such as control switches used for signalling, sensors, and the like. It is noted that the auxiliary frame 28 is maintained in a fixed relative position with respect to the wheels 16. In the outboard journal truck illustrated, precise alignment between the devices such as the third rail collector 30 and the wheels 16 is essential. Also, the resilient element 29 provides isolation from the frame 28 and journal boxes on the truck.

Figure 4:
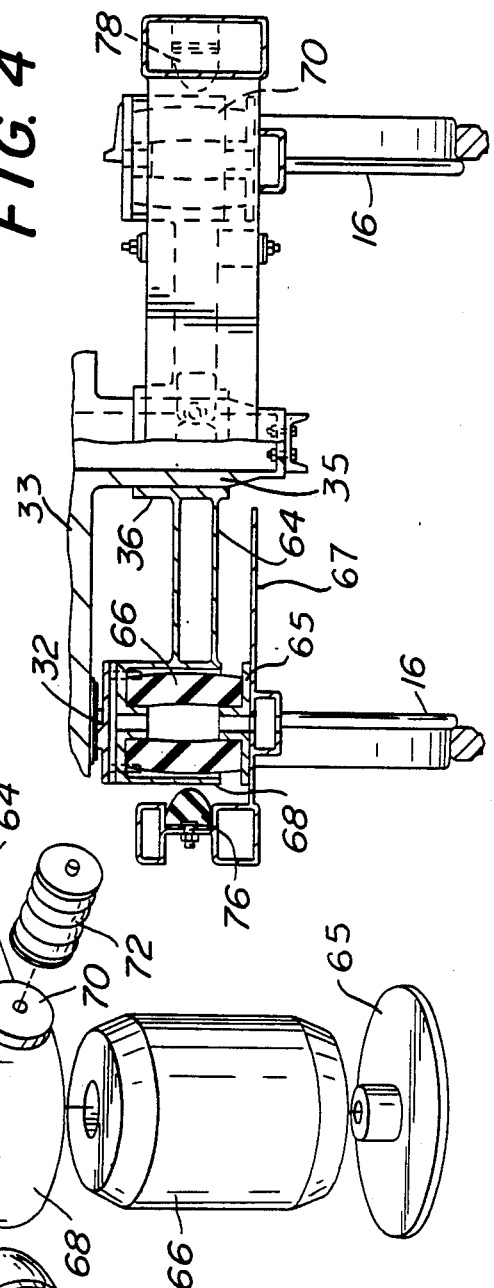
FIG. 4 is a cross-sectional view taken along lines 4—4 of FIG. 1.

A pair of sliders 32 and 34 are disposed to receive a car body 33 illustrated in FIG. 4. Car body 33 includes a kingpin 35 to fit into a kingpin connector 36. Various motors and gear boxes and other conventional items may be connected to the truck 10. FIG. 1 is generally illustrated to show the overall truck arrangement with respect to the use of the auxiliary frame 28. Outside of the primary and secondary suspension members, other items illustrated may be conventional and therefore not described in detail.

Referring to FIG. 2, only the elements associated with the journal box assembly 26 will be described in detail, it being understood that the other journal box assemblies involve similar arrangements. The side frame 12 includes attachment members 38, 40 and a member providing opening 42. The attachment members 38 and 40 are designed to receive longitudinal springs 50 and the opening 42 is designed to receive the vertical suspension spring 54, as will be described.

In the embodiment illustrated, lateral springs 44 are mounted between sections 62 on the journal box assembly and a housing closure plate 48. The longitudinal control springs 50 are connected between members 38 and 40 and closure plates 52. The six springs 44 and 50 may be substantially identical in many cases.

The vertical spring rate is provided by a spring 54 which is relatively soft and made of an elastomeric material. The closure plate 56 is provided for the spring 54. In an assembled condition, the load from the lateral longitudinal and vertical springs are applied to the journal bearing assembly 26. The journal assembly 26 fits over the axle 18 (FIG. 1) and becomes the means by which the axle and bearing can be loaded. In assembled position, the journal assembly 26 is extended below the sideframe 12, as illustrated in FIG. 1.

The vertical spring 54 inserted through the opening 42 sits on the top socket 58 of the journal bearing housing 26. The longitudinal springs 50 are connected to the journal box 26 at connecting elements 60 on the journal assembly, only one of which is illustrated. Four lateral springs 44 are connected to four sections 62 extending from the journal box housing 26. The various springs 44, 50 and 54 include pin elements therein to provide indexing of the springs on the proper locations on the journal bearing 26.

The housing closure plate 48 is connected to the side frame 12. During assembly, the closure plate 48 decompresses the lateral control springs 44 to provide a tight and controlled configuration on the truck with no lost motion. The closure plate 48 also provides a structural load path to close or complete the journal structure. The plate 48 provides an opening through which the journal assembly 26 passes and limits the total excursion of the truck for the primary suspension system. If any of the rubber should fail in the springs, the opening in the closure plate provides longitudinal and lateral control constraints for the whole system. In other words, it is a fail-safe portion of the system.

After assembling the closure plate 48 to the frame 12 by conventional means, the springs 50 including locating pins 63 are applied in the leading and trailing edges of the journal assembly 26. They are preloaded during assembly by the closure plates 52. This arrangement provides a precompressed longitudinal control.

The springs 44 and 50 are designed to have laminated metal plates and elastomeric portions which control the amount of stress and compression that can be applied to the springs. The more plates that are used, the higher the compression and the higher the spring rate may be. With less plates, the softer the spring rate may be. Therefore, as a function of the change in the weight of the car and the design of the car, these spring rates within the geometry shown may be modified by only modifying a number of plates in the control spring configuration. At the same time, the springs 44 and 50 move in a vertical direction in shear. Because of the nature of the elastomeric material, the shear modulus is extremely low so therefore in the vertical direction, the control springs provides a minimal amount of constraint or springing. Laminated springs with metal and elastomeric layers have been used in the prior art.

In cases of the lateral or longitudinal suspensions, the springs 44 and 50 loaded in compression and, depending on how the buldge areas are controlled, the number of plates in the spring and other factors, the spring may be made as stiff or soft as desired.

The upper spring 54 is known as a rubber marshmellow spring commercially available. Any elastomeric material may be used and, in some cases, mechanical springs may be used.

It is noted that separate springs are used in the vertical, lateral and longitudinal directions, that the different spring rates may be independently adjusted. As mentioned, the adjustments may be made by the use of material or by changing the number of plates involved in the springs. As also mentioned, the types of springs used including the plate members are conventional springs and therefore not described in any further detail.

Figure 3:
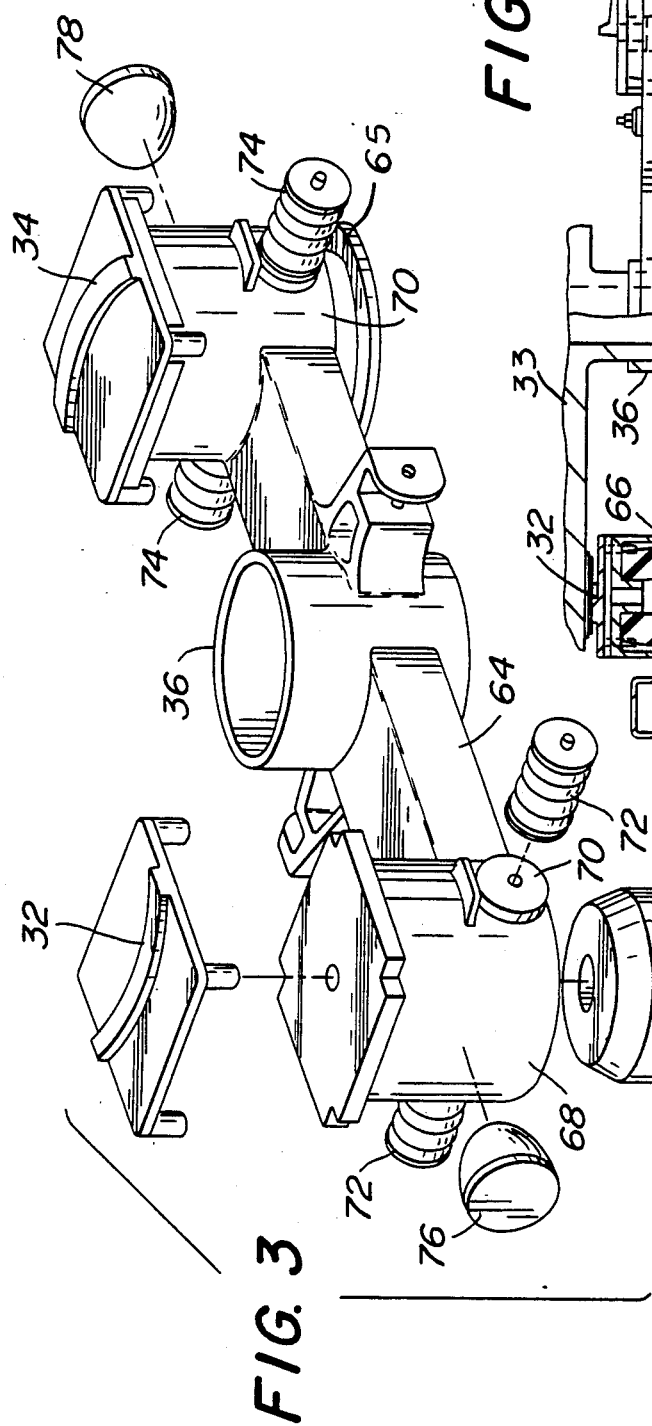
FIG. 3 is an isometric exploded view of the elements of the secondary suspension system included in the truck illustrated in FIG. 1.

Referring to FIG. 3, the secondary suspension system is illustrated and includes a steering beam 64. The kingpin opening 36 for receiving the kingpin 35 of a car body (FIG. 4) is incorporated into the steering beam 64. The purpose of the steering beam 64 is not to provide a vertical support for the car or beaming for the vertical reaction between the car body and truck frame. The steering beam is a device that provides control of the secondary marshmellow springs 66, of which only one is illustrated. It is desirable that the marshmellow springs 66 be maintained in vertical positions at all times. This is provided by permitting beam 64 to rotate about the kingpin inserted into the connector 36.

The steering beam 64 include hollow receptacle portions 68 and 70 designed to receive the springs 66 therein. Attachment means 70 are connected to the members 68 and 70 to receive the longitudinally disposed springs 72 and 74. Lateral bumpers 76 and 78 are provided for the secondary suspension system. Bottom plates 65 close the receptacles 68 and 70 to maintain the springs 62 therein.

Instead of using anchor rods as in many conventional cars, the control springs 72 and 74 are employed. The springs 72 and 74 may be relatively stiff in the longitudinal direction and very soft in the vertical direction.

Referring to FIG. 4, along with FIGS. 2 and 3, the car body 33 rests on the slide elements 32 and 34. Because of this, the loads from the car body are transmitted to the side frames 12 and 14 through beam 67. Because the loads are not at the center of the truck as when a conventional bolster is used, the overall truck weight may be considerably reduced.

The present invention has provided an overall novel truck in which an outboard journal bearing is used and an auxiliary frame with isolating means are employed to maintain devices, such as third rail pickups and the like, to be maintained at predetermined distance from the track. The auxiliary frame is required because of the relatively soft spring rates in which the excursions of the car are greatly in excess of those found in conventional cars.

The primary suspension described is extremely soft and provides means for independent adjustment of the lateral, longitudinal and vertical springs. The secondary suspension system avoids the use of conventional bolsters and utilizes the steering beam which makes it possible to maintain the vertical springs in a vertical direction during movements of the car and provides an improved load transmission path which makes it possible to provide a lighter truck.

What is claimed is:

1. In combination with a truck having a pair of side frames, journal box assemblies, a pair of wheel-axle units having wheels and axles, and means for mounting said journal box assemblies to said side frames to receive the axles of said wheel-axle units,
   a primary suspension system comprising:
   (a) a plurality of compressed springs including laminated metal plates and elastomeric portions laterally disposed between said side frames and said journal box assemblies and spaced from the axes of said axles;
   (b) a second plurality of compressed springs including laminated metal plates and elastomeric portions longitudinally disposed between said side frames and said journal box assemblies at the leading and trailing edges of said journal box assemblies, and
   (c) elastomeric vertical springs disposed between said side frames and said journal box assemblies,
   whereby said laterally, longitudinally and vertically disposed springs are independently adjustable to control the lateral, longitudinal and vertical spring rates of said primary suspension system.

2. A primary suspension system as set forth in claim 1 wherein said springs longitudinally and laterally disposed comprise laminated elastomeric elements interposed between metal plates whereby the longitudinal and lateral spring rates are controlled by the number and type of said elastomeric elements.

3. A combination as set forth in claim 2 wherein a secondary suspension system is provided including a steering beam having a center opening for receiving a center pin of said car body.

4. A combination as set forth in claim 3 wherein said steering beam includes a pair of housing structures disposed at the ends thereof to receive vertical springs therein.

5. A combintion as set froth in claim 4 wherein a pair of vertical spring members are disposed within said pair of housing structures on said side frames.

6. A combination as set forth in claim 5 wherein slide bearings are disposed on the top of said housing structures to receive said car body thereon whereby the load from said car body is transmitted through said pair of vertical spring members to said side frames.

7. A combination as set forth in claim 6 wherein said steering beam is free to move about said center pin to maintain said vertical spring members in vertical positions during movement thereof.

8. A combination as set forth in claim 7 wherein pairs of longitudinally disposed springs are disposed between said housing structures and said truck.

9. A combination as set forth in claim 8 wherein said journal box assemblies are disposed outboard of said wheels.

10. A combination as set forth in claim 9 wherein there is provided an auxiliary frame secured to a pair of said journal box assemblies parallel to one side of said truck to provide a uniform distance between said auxiliary frame and the wheels of said truck.

11. A combination as set forth in claim 10 wherein resilient means are connected between said auxiliary frame and said pair of journal box assemblies.

12. A combination as set forth in claim 11 wherein electrical devices are connected to said auxiliary frame.

* * * * *